(12) United States Patent
Domokos

(10) Patent No.: US 6,658,070 B1
(45) Date of Patent: Dec. 2, 2003

(54) DIRECT CONVERSION RECEIVER AND METHOD OF COMPENSATING INTERFERENCE SIGNALS GENERATED DURING PROCESSING

(75) Inventor: John Domokos, Salisbury (GB)

(73) Assignee: Roke Manor Research Limited, Hampshire (GB)

( * ) Notice: Subject to any disclaimer, the term of this patent is extended or adjusted under 35 U.S.C. 154(b) by 0 days.

(21) Appl. No.: 09/459,466

(22) Filed: Dec. 13, 1999

(30) Foreign Application Priority Data

Dec. 12, 1998 (GB) .............................................. 9827289

(51) Int. Cl.⁷ ................................................ H03D 1/04
(52) U.S. Cl. ....................... 375/346; 375/332; 375/344; 375/373
(58) Field of Search ................................ 375/346, 344, 375/332, 373

(56) References Cited

U.S. PATENT DOCUMENTS

| | | | |
|---|---|---|---|
| 4,814,715 A | | 3/1989 | Kasperkovitz ................ 329/50 |
| 4,955,039 A | * | 9/1990 | Rother et al. ................ 375/316 |
| 5,339,040 A | | 8/1994 | Loper .......................... 329/358 |
| 5,715,281 A | * | 2/1998 | Bly et al. .................... 375/344 |

FOREIGN PATENT DOCUMENTS

| | | | |
|---|---|---|---|
| GB | 2 296 613 A | 7/1996 | ............ H03D/7/81 |
| WO | WO 91/14311 | 9/1991 | ............ H04B/1/06 |
| WO | WO 94/29948 | 12/1994 | ............ H03D/3/00 |

* cited by examiner

Primary Examiner—Stephen Chin
Assistant Examiner—Guillermo Munoz
(74) Attorney, Agent, or Firm—Crowell & Moring LLP

(57) ABSTRACT

A direct conversion receiver which compensates for interfering signals introduced during processing. Direct conversion is achieved using direct detection techniques which introduce interfering signals which become inseparable from the wanted signal. A pilot signal (202) is added to an input RF signal (200) prior to passing the summed signal (206) to four separate paths (210, 212, 214, 216). Signal (206) is modulated so that the phase is different in each path using local oscillator signals and switches (230, 232, 234, 236), and then digitised by ADCs (260, 262, 264, 266). Correction is introduced into respective paths (210, 214) by cancellation loops (310, 314) to compensate for unwanted signals prior to the paths being grouped so that the pairs of digitised signals (272, 300; 276; 304) which are 180° out of phase with one another are subtracted to provide output inphase and quadrature signals (220, 224). Each cancellation loop (310, 314) includes a scale and shift module (290, 294) which is controlled by signals (340, 344) which are derived from the output signals (220, 224).

9 Claims, 4 Drawing Sheets

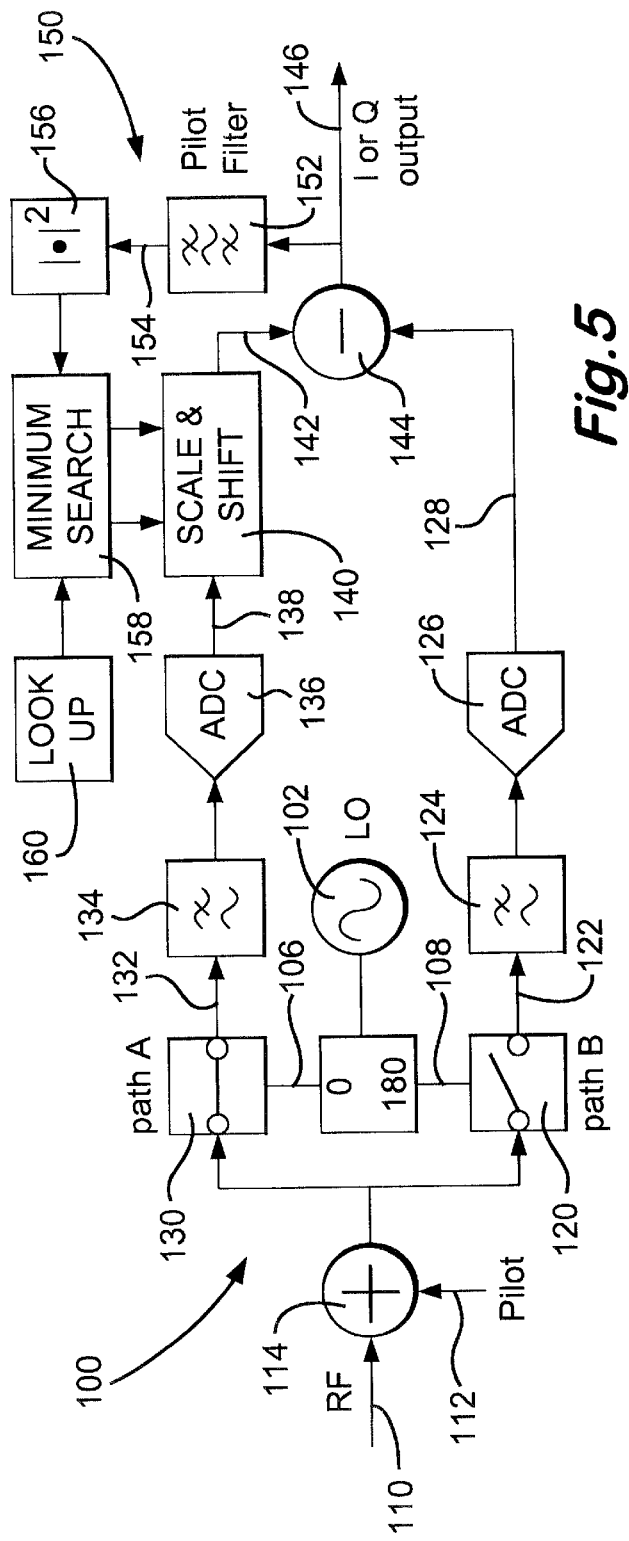
Fig. 5
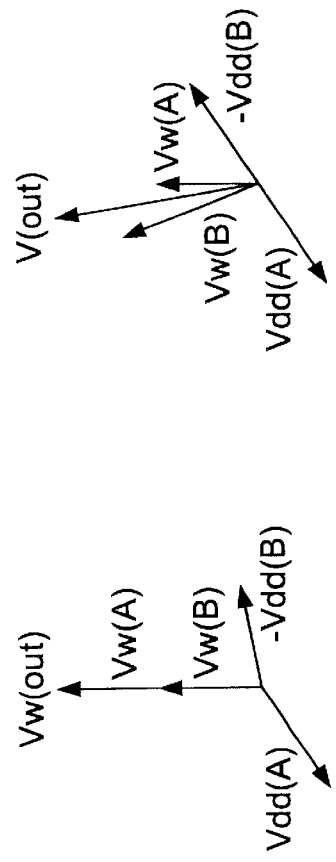
Fig. 6.a  *Before Correction*
Fig. 6.b  *After Correction*

DIRECT CONVERSION RECEIVER AND METHOD OF COMPENSATING INTERFERENCE SIGNALS GENERATED DURING PROCESSING

The present invention relates to improvements in or relating to receivers, and is more particularly concerned with direct conversion receivers.

Direct conversion receivers have a major advantage over conventional superheterodyne architecture because the intermediate frequency (IF) is zero, and there is no need for image filtering. Furthermore, spurious products produced by the mixer (due to the harmonics of the radio frequency (RF) and the local oscillator) fold into DC and hence RF filtering is not required. These features associated with direct conversion are extremely useful for broadband applications such as "software radio" or multicarrier receivers.

One major problem, however, with direct conversion is the direct detection which is caused by the non-linearity of mixers used in the conversion. The even order terms demodulate the envelope of any interfering signals within the RF bandwidth, and these then fold into the I/Q baseband and become inseparable from the wanted signal. Because of this problem, direct conversion receivers are only suitable for applications where the interference is low, for example, in satellite receivers.

It is therefore an object of the present invention to provide an improved direct conversion receiver which overcomes the problems mentioned above.

In accordance with one aspect of the present invention, there is provided a method for converting an input radio frequency signal to an output signal, the method comprising the steps of:

a) receiving the input signal;
b) applying the received signal to at least a first and a second processing path;
c) modulating the received signal in each processing path to produce modulated signals having different phases; and
d) combining the modulated signals from each path to provide the output signal;
  characterised in that the method further comprises the step of applying correction to at least one of the processing paths prior to step d).

Advantageously, the modulated signals are digitised prior to correction.

Correction is applied by means of a cancellation loop driven by the output signal, the cancellation loop determining a power value for the output signal, using the power value to generate a correction signal, and using the correction signal to adjust the amplitude and phase of the modulated signal. Additionally, step a) may comprise adding a pilot signal to the received signal for calibrating differential non-linearity between processing paths, the pilot signal being filtered from the output signal prior to determining the power value.

In a preferred embodiment, step d) comprises subtracting the processing paths.

In accordance with another aspect of the present invention, there is provided a receiver comprising:

means for receiving an input signal;
means for applying the received signal to at least a first and a second processing path;
modulation means for modulating the signals in each signal path to produce modulated signals having different phases; and
combining means for combining the modulated signals from each path to provide an output signal;
characterised in that the receiver further comprises correction means for applying a correction to at least one of the processing paths prior to combination.

For a better understanding of the present invention, reference will now be made, by way of example only, to the accompanying drawings in which:

FIG. 5 is a schematic block diagram of an adaptive cancellation system for direct detection components in accordance with the present invention;

Figure 7:
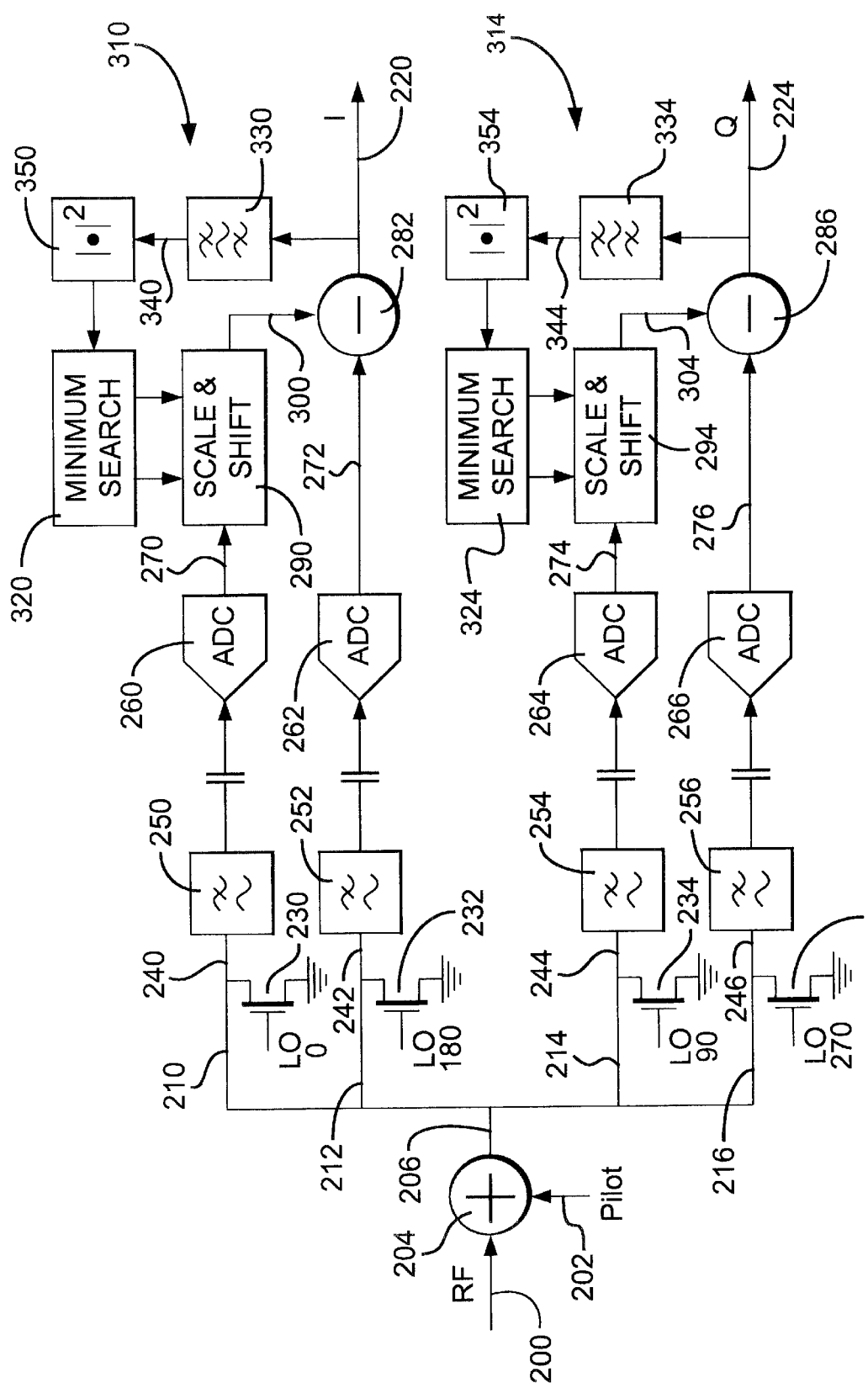

FIGS. 6.a and 6.b illustrates the effect of scaling and phase rotation as a result of the adaptive cancellation system shown in FIG. 5; and FIG. 7 is a schematic block diagram of a direct conversion receiver in accordance with the present invention.

The present invention improves the performance of direct conversion by adaptively cancelling the second and higher order even terms. This has the effect of reducing the direct detection component. As a result, improved tolerance to interference is achieved which makes a direct conversion receiver suitable for mobile communication applications.

Figure 1:
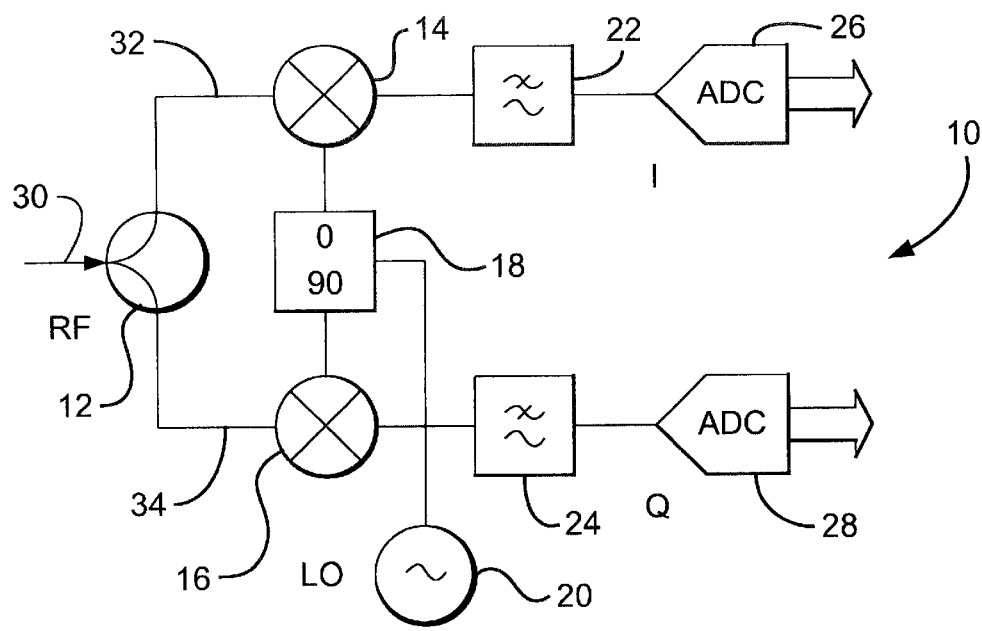
FIG. 1 is a schematic block diagram of a direct conversion receiver.

FIG. 1 illustrates a direct conversion receiver 10 comprising a splitter 12, mixers 14, 16, phase generator 18 connected to a local oscillator 20, bandpass filters 22, 24 and analogue-to-digital converters (ADC) 26, 28. An input RF signal 30 is received by splitter 12 and passed to mixers 14, 16 as shown as component signals 32, 34. Mixers 14, 16 produce inphase, I, and quadrature, Q, signal components respectively when the component signals 32, 34 are mixed with signals from the phase generator 18. The I and Q signal components are then filtered by respective bandpass filters 22, 24 and then converted to digital signals in ADCs 26, 28. Mixers 14, 16 suppress even order terms of the direct conversion, and limits the achievable cancellation to between 20 and 30 dB.

A key building block of the direct conversion receiver 10 shown in FIG. 1 is a double balanced mixer. A typical implementation of a double balanced mixer comprises a diode ring, but it will readily be appreciated by a person skilled in the art that other arrangements, such as, field effect transistors (FETs) in a ring or a Gilbert cell configuration, could also be used to replace the diode ring.

Figure 2:
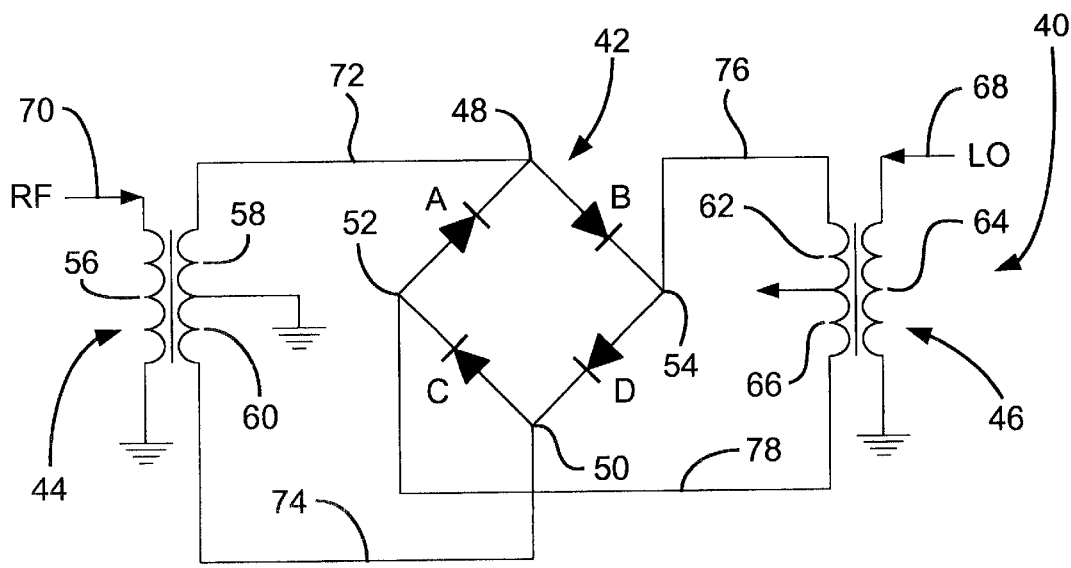
FIG. 2 is a schematic block diagram of a double balanced mixer system used in a direct conversion receiver.

In FIG. 2, a double balanced mixer 40 is shown. The mixer 40 comprises a diode ring 42 connected to across an input transformer 44 and an output transformer 46 as shown. The diode ring 42 comprises four diode elements A, B, C, D, and the ring is connected to the input transformer 44 at junctions 48, 50 and to the output transformer 46 at junctions 52, 54. Input transformer 44 has a grounded primary side 56 which receives an input signal, and a secondary side 58 connected to ring 42 at junctions 48, 50. The secondary side 58 has a central tap 60 to ground. The output transformer 46 is similar to the input transformer 44 and has a primary side 62, a grounded secondary side 64 and a central tap 66 in the primary side 62. The secondary side 64 of the output transformer 46 is connected to receive a local oscillator signal 68.

An input RF signal 70 is received by the primary 56 of the input transformer 44. An inphase signal component 72 and an antiphase signal component 74 are taken from the secondary 58 of the transformer 44 as shown. The inphase component 72 is passed to the ring 42 through junction 48 and the antiphase component 74 is passed to the ring 42 through junction 50. The output from the ring 42 is taken from junctions 52, 54 and connected across the primary side 62 of the output transformer 46. This means that local oscillator signal 68 is present on line 76 and an out of phase signal is present on line 78. An output IF signal 80 is taken from central tap 66 on the output transformer 46.

Figure 3:
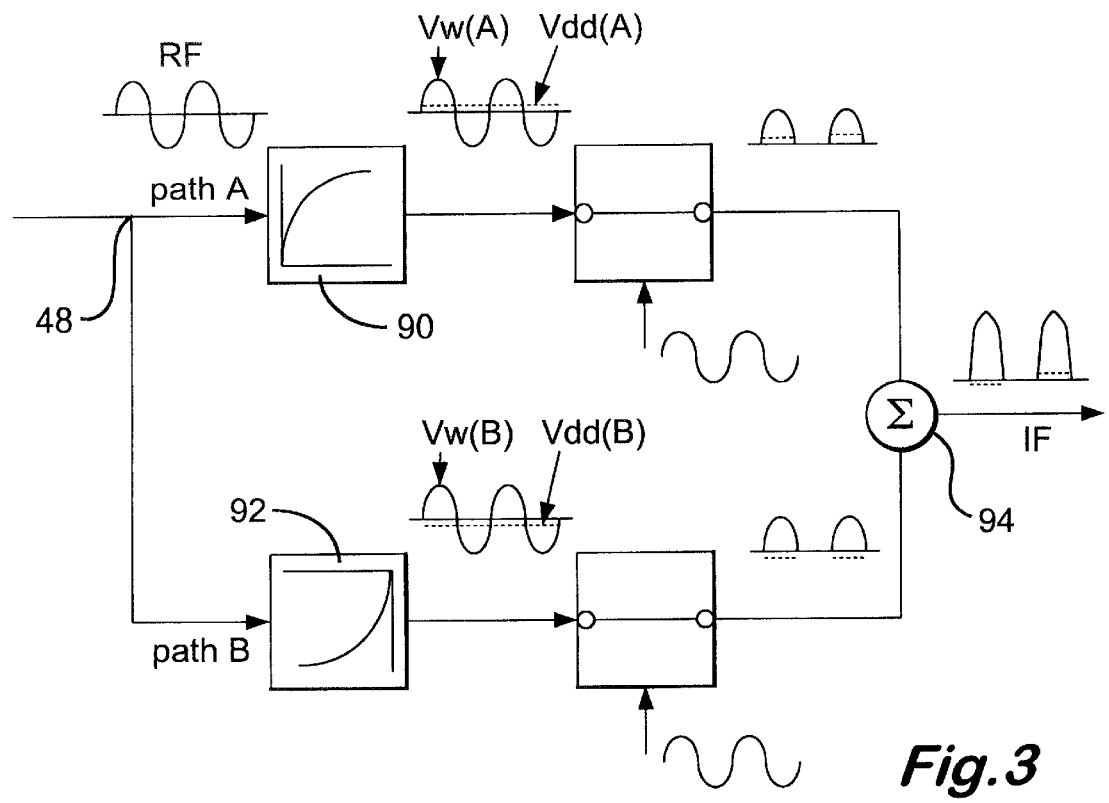
FIG. 3 illustrates a mechanism for direct detection in the mixer system shown in FIG. 2 which uses switching devices of opposite polarity.

A mechanism for direct detection for the paths A and B through respective ones of diodes A and B is shown in FIG. 3. Points which correspond to FIG. 2 are labelled alike. Diodes A, B are shown as respective non-linear switches 90, 92 which demodulate the envelope of interfering signals, Vdd. Switches 90, 92 operate in opposite polarity and therefore the interfering signal in path A, Vdd(A), and the interfering signal in path B, Vdd(B) appear in opposite phase at summing point 94. It will be appreciated that summing point 94 corresponds to tap point 66 in FIG. 2.

In path A, after passing through switch 90, the RF signal is shown as Vw(A) with interfering signal Vdd(A) produced by the switch 90. After mixing with the local oscillator signal, a rectified signal is produced as shown. In this path, the interfering signal Vdd(A) is shown as being positive. Similarly, for path B, after passing through switch 92, the RF signal is shown as Vw(B) with interfering signal Vdd(B) produced by switch 92, and after mixing with the local oscillator signal, a rectified signal is produced. In this path, the interfering signal Vdd(B) is shown as being negative. When the two signal paths are summed at 94 to produce an IF signal having a magnitude which is the sum of the magnitudes of Vw(A) and Vw(B), it can be seen that cancellation is not exact, but is balanced, that is, one negative interfering signal followed by one positive interfering signal.

If the characteristics of diodes A and B were to be identical, interfering signals Vdd(A) and Vdd(B) from each path would cancel out completely and no direct detection would be possible. However, as the characteristics of the diodes A, B are not identical, the cancellation between path A and path B is imperfect. In practice, an even mode cancellation of around 20 to 30 dB is achieved. In a mobile telecommunications environment, the envelopes of the interfering signals can be between 70 and 80 dB higher than that of the wanted signal. This results in the achievable cancellation in the balanced mixers being inadequate.

Figure 4:
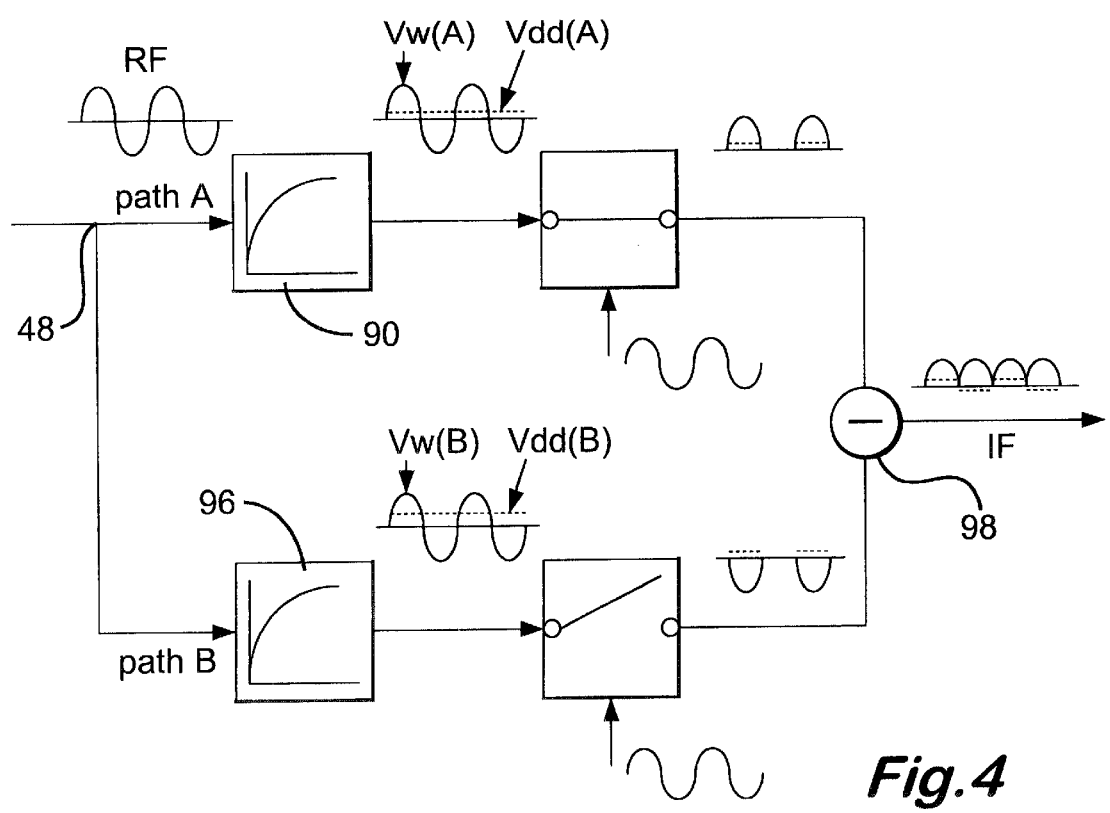
FIG. 4 is similar to FIG. 3, but the switching devices operate in the same polarity for direct detection.

It is possible to arrange the non-linear switches to operate with the same polarity, and in this case, the local oscillator needs to be inphase and in antiphase and paths A and B subtracted. One suitable arrangement is shown in FIG. 4. In FIG. 4, points which correspond to FIG. 2 are labelled alike. Path A is exactly the same in FIG. 4 as it is in FIG. 3 and its description will not be repeated. However, path B has a non-linear switch 96 which is of the same polarity as switch 90 so that the interfering signal Vdd(B) is positive. In order to effect cancellation, one of the two paths must be inverted so that when the two signal paths are combined, there is balanced cancellation. In this case, the RF signal in path B is mixed with a local oscillator signal which is antiphase to that used for path A, that is, 180° out of phase with the local oscillator signal mixed with the RF signal in path A. The rectified signal is then inverted and 180° out of phase with the rectified signal from path A. When the signals from path A and path B are subtracted from one another in subtractor 98, the output IF signal is fully rectified with the interfering signals balanced as shown.

It is to be noted, however, that once the signals in paths A and B have been summed (as shown in FIG. 3) or subtracted (as shown in FIG. 4), the residual unwanted components Vdd(A)+Vdd(B) or Vdd(A)−Vdd(B) cannot be separated from the wanted IF signal.

In accordance with the present invention, the signals in path A and path B are processed separate from one another prior to summation or subtraction takes place. Correction to the magnitude and phase is also carried out adaptively prior to summation or subtraction. A circuit for correcting the magnitude and phase prior to summation/subtraction is shown in FIG. 5.

In FIG. 5, circuit 100 comprises two paths, path A and path B, as described above with reference to FIGS. 3 and 4. A local oscillator 102 supplies signals to a phase generator 104 which provides an output inphase signal 106 and an output antiphase signal 108. An input RF signal 110 is summed with a pilot signal 112 in summator 114 prior to being passed to both path A and path B. The pilot signal 112 is used to calibrate the differential non-linearity between path A and path B, and may comprise an amplitude modulated signal, the modulation rate being outside the baseband width of the input RF signal. In path B, switch 120 is controlled by the antiphase signal 108 to modulate the RF signal to form modulated signal 122. Filter 124 filters the modulated signal 122 and ADC 126 digitises the filtered signal, signal 128, prior to combination with the signal component in path A. In path A, switch 130 is controlled by the inphase signal 106 to modulate the RF signal to form modulated signal 132. Filter 134 filters the modulated signal 132 and then ADC 136 digitises the filtered signal, signal 138, prior to subsequent combination with the signal component in path B. After digitisation, the digitised signal 138 is passed to a scale and shift module 140 which adjusts the signal 138 to cancel out the unwanted signals Vdd(A) and Vdd(B) introduced by switches 120 and 130 respectively. The adjusted signal 142 is then passed to subtractor 144 where signal 128 is subtracted from signal 142 to provide an output signal 146. Output signal 146 may be an inphase signal, I, or a quadrature signal, Q.

As shown, scale and shift module 140 forms part of a cancellation loop 150 which is effectively a feedback loop. Output signal 146 is passed through a pilot filter 152 to select the pilot signal 112. The pilot filter 152 comprises a finite impulse response (FIR) filter which selects the residual components of the demodulated envelope, Vdd(A)−Vdd(B), introduced by switches 120 and 130, and uses this signal to control the cancellation loop 150. The power of filtered signal 154 is determined in block 156. The determined power value is then used as one input to a search device 158 which carries out a search for a minimum power value and controls the scale and shift module 140 in accordance with that value. A look-up table 160 is connected to device 158 to provide correction values in accordance with the minimum power value.

It is to be noted that the total power of the wanted signal and the residual components, $Vw^2+(Vdd(A)-Vdd(B))^2$ is always greater than the power of the wanted signal, $Vw^2$, because the interference is not a correlated signal. Therefore, the correction loop 150 will operate even without a pilot signal 112. In this case, the interference signal, Vdd(A)−Vdd(B), is used as the 'pilot' for the minimum power search. However, the achievable signal-to-noise ratio obtained at the output is limited by the resolution of the cancellation loop alone.

As a result of cancellation, the magnitude of the wanted signal is slightly altered and its phase is shifted. This is shown in FIGS. 6.a and 6.b. Before correction or cancellation, the magnitude of the output wanted signal, Vw, is the sum of the two signal components in pages A and B, Vw(A)+Vw(B). After correction or cancellation, the magnitude of the output wanted signal Vw, is the sum of components of Vw(A) and Vw(B) as there is a phase shift between the two signal components. Given that the switches 120, 130 are implemented as a matched pair (located close to each other on a wafer), this effect is insignificant. In most cases, adequate correction or cancellation can be achieved with amplitude scaling only. The amount of phase shifting is no more than 2 to 3°.

A preferred embodiment of a receiver incorporating correction or cancellation in accordance with the present invention is shown in FIG. 7. Input RF signal 200 is summed with a pilot signal 202 in summator 204 as described above. Summed signal 206 is passed to four paths, 210, 212, 214, 216 as shown. The paths are paired to form two circuits equivalent to circuit 100 described above with reference to FIG. 5. In this case, one pair of paths 210, 212 produces an inphase (I) output signal 220, and the other pair of paths 214, 216 produces a quadrature (Q) output signal 224. Parallel gallium arsenide (GaAs) switches 230, 232, 234, 236 are provided in respective paths 210, 212, 214, 216. Although parallel GaAs switches are used in this embodiment, but it will readily be appreciated that other similar devices may also be used. Switch 230 is connected to provide a modulated signal 240 which is inphase with signal 200. Similarly, switch 232 is connected to provide a modulated signal 242 which is antiphase with respect to signal 200. Switch 234 is connected to provide a modulated signal 244 which is 90° out of phase with signal 200, and switch 236 is connected to provide modulated signal 246 which is 270° out of phase with signal 200. Each modulated signal 240, 242, 244, 246 is filtered by respective filters 250, 252, 254, 256 and passed to respective AC coupled ADCs 260, 262, 264, 266. The ADCs are AC coupled to eliminate the unnecessary reduction of dynamic range of the circuit due to DC offset. Digitised signals 272 and 276 in respective paths 212, 216 are then passed to respective subtractors 282, 286 for combination with signals from respective paths 210, 214. Digitised signals 270, 274 are passed to respective scale and shift modules 290, 294 for correction or cancellation. Corrected or cancelled signals 300, 304 are passed to respective subtractors 282, 286 as shown where respective output signals 220, 224 are produced as described above.

As before, each scale and shift module 290, 294 forms part of respective cancellation loops 310, 314 and each is controlled by a search device 320, 324 which operates as described above. Output signals 220, 224 are filtered by respective pilot filters 330, 334 to provide filtered signals 340, 344 which have the pilot signal 202 removed. The power of respective filtered signals 340, 344 is determined in blocks 350, 354, and the power values are passed to respective search devices 320, 324 as described above.

It will be appreciated that there are other configurations which are equally suitable for implementation of the present invention. For example, series or parallel configurations of diodes, bipolar devices and field effect transistors (FETs) may be utilised. Topologies may also include ring or Gilbert cell arrangements. However, in all cases, the signal components in each path are to be digitised before summation or subtraction.

What is claimed is:

1. A method for converting an input radio frequency signal to an output signal, the method comprising the steps of:
   receiving the input signal;
   applying the received signal to at least a first and second processing path;
   modulating the received signal in each of said at least a first and a second processing path to produce modulated signals having different phases;
   combining the modulated signals from each of said at least a first and a second processing path to provide the output signal; and
   applying a correction to at least one of the processing paths prior to said combining step;
   wherein said correction is applied by means of a cancellation loop driven by the output signal, the cancellation loop determining a power value for the output signal, using the power value to generate a correction signal, and using the correction signal to adjust amplitude and phase of the modulated signal.

2. A method according to claim 1, further comprising the step of digitizing the modulated signals prior to correction.

3. The method according to claim 1, wherein said receiving step comprises adding a pilot signal to the received signal for calibrating differential non-linearity between processing paths, the pilot signal being filtered from the output signal prior to determining the power value.

4. The method according to claim 1, wherein said combining step comprises subtracting the processing paths.

5. A receiver comprising:
   means for receiving an input signal;
   means for applying the received signal to at least a first and a second processing path;
   modulation means for modulating the signals in each signal path to produce modulated signals having different phases;
   combining means for combining the modulated signals from each path to provide an output signal; and
   correction means for applying a correction to at least one of the processing paths prior to combination;
   wherein the correction means comprises a cancellation loop driven by the output signal, the cancellation loop comprising means for determining a power value for the output signal, means for generating a correction signal and means for adjusting the amplitude and the phase of the modulated signal in accordance with the correction signal.

6. A receiver according to claim 5, further comprising means for digitizing the modulated signals prior to correction.

7. A receiver according to claim 6, further comprising filter means for filtering the modulated signals prior to digitization.

8. The receiver according to claim 5, further comprising:
   means for adding a pilot signal to the received signal for calibrating differential non-linearity between processing paths; and
   means for filtering the output signal to remove the pilot signal prior to the means for determining the power value.

9. The receiver according to claim 5, wherein the combining means comprises a subtractor.

* * * * *